United States Patent [19]

Cane et al.

[11] Patent Number: 6,028,039

[45] Date of Patent: *Feb. 22, 2000

[54] HIGHLY OVERBASED LUBRICATING OIL ADDITIVE CONCENTRATES THEIR PREPARATION AND USE

[75] Inventors: Charles Cane; Stephen J Cook, both of North Humberside, United Kingdom

[73] Assignee: Lubrizol Adibis Holdings (UK) Limited, Merseyside, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/895,692

[22] Filed: Jul. 17, 1997

Related U.S. Application Data

[63] Continuation of application No. 08/298,154, Aug. 30, 1994, abandoned.

[30] Foreign Application Priority Data

Sep. 10, 1993 [GB] United Kingdom .................. 9318810

[51] Int. Cl.[7] ................................................ C10M 159/22
[52] U.S. Cl. ........................................... 508/460; 508/574
[58] Field of Search .................... 508/460, 574; 568/40, 48

[56] References Cited

U.S. PATENT DOCUMENTS

| | | | |
|---|---|---|---|
| 5,162,085 | 11/1992 | Cane et al. | 508/460 |
| 5,281,345 | 1/1994 | Crawford | 508/460 |
| 5,330,665 | 7/1994 | Cane et al. | 508/460 |
| 5,433,871 | 7/1995 | O'Connor et al. | 508/460 |
| 5,437,803 | 8/1995 | Cane et al. | 508/460 |
| 5,441,652 | 8/1995 | O'Connor et al. | 508/460 |
| 5,714,443 | 2/1998 | Cane et al. | 508/460 |
| 5,716,914 | 2/1998 | Cane et al. | 508/460 |

*Primary Examiner*—Margaret Medley
*Attorney, Agent, or Firm*—Michael F. Esposito

[57] ABSTRACT

An additive concentrate having a TBN greater than 300 suitable for incorporation into a finished lubricating oil composition comprising:

(I) a lubricating oil soluble sulphurised or non-sulphurised alkaline earth metal hydrocarbyl phenate derived either from a hydrocarbyl phenate or its precursors and modified by reaction to incorporate:

(i) an aldehyde, and
  (ii) from greater than 2 to less than 40% by weight based on the weight of the concentrate of either (a) at least one carboxylic acid having the formula:

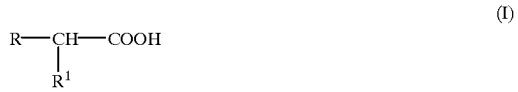

(I)

wherein R is a $C_{10}$ to $C_{24}$ alkyl or alkenyl group and $R^1$ is either hydrogen, a $C_1$ to $C_4$ alkyl group or a —$CH_2$—COOH group, or an anhydride or ester thereof, or (b) a di- or polycarboxylic acid containing from 36 to 100 carbon atoms or an anhydride or ester thereof, and (II) a lubricating oil, wherein the amount of lubricating oil (II) in the additive concentrate is such that the ratio of the weight of the additive concentrate to the weight of the hydrocarbyl phenate or its precursors from which the modified sulphurised or non-sulphurised phenate is derived is at least 3.0.

14 Claims, No Drawings

HIGHLY OVERBASED LUBRICATING OIL ADDITIVE CONCENTRATES THEIR PREPARATION AND USE

This is a Continuation of application Ser. No. 08/298,154, filed Aug. 30, 1994, now abandoned.

The present invention relates in general to lubricating oil additive concentrates having a total base number (TBN) greater than 300 containing an alkaline earth metal hydrocarbyl phenate, a process for their production and finished lubricating oil compositions containing the additive concentrate.

In the internal combustion engine, by-products from the combustion chamber often blow by the piston and admix with the lubricating oil. Many of these by-products form acidic materials within the lubricating oil. This is particularly marked in diesel engines operating on low-grade fuels of high sulphur content wherein corrosive acids are produced by combustion. The acids thereby incorporated in the lubricating oil can include sulphur acids produced by oxidation of sulphur, hydrohalic acids derived from halogen lead scavengers in the fuel and nitrogen acids produced by the oxidation of atmospheric nitrogen within the combustion chamber. Such acids cause deposition of sludge and corrosion of the bearings and engine parts leading to rapid wear and early breakdown of the engine.

Compounds generally employed to neutralise the acidic materials and disperse sludge within the lubricating oil include metal alkyl phenates, wherein the metal is generally an alkaline earth metal such as calcium, magnesium or barium. Both "normal" and "overbased" alkaline earth metal alkyl phenates have been employed. The term "overbased" is used to describe those sulphurised alkaline earth metal alkyl phenates in which the ratio of the number of equivalents of the alkaline earth metal moiety to the number of equivalents of the phenol moiety is greater than one, and is usually greater than 1.2 and may be as high as 4.5 or greater. In contrast, the equivalent ratio of alkaline earth metal moiety to phenol moiety in "normal" alkaline earth metal alkyl phenates is one. Thus, the "overbased" material contains greater than 20% in excess of the alkaline earth metal present in the corresponding "normal" material. For this reason "overbased" sulphurised alkaline earth metal alkyl phenates have a greater capability for neutralising acidic matter than do the corresponding "normal" alkaline earth metal alkyl phenates.

Alkaline earth metal sulphurised hydrocarbyl phenate-containing compositions having a high TBN (total base number as measured in mg KOH/g by the method of ASTM D2896), that is a TBN greater than 300, typically greater than 350, and a viscosity measured at 100° C. of less than 1,000 cSt, preferably less than 750 cSt, more preferably less than 500 cSt, and processes for producing them are known. Thus, our EP-A-271 262 discloses an additive concentrate suitable for incorporation into a finished lubricating oil composition, the additive concentrate comprising:

(a) a lubricating oil, (b) a lubricating oil soluble sulphurised or non-sulphurised alkaline earth metal hydrocarbyl phenate modified by incorporation of from greater than 2 to less than 40% by weight based on the weight of the composition of either (i) at least one carboxylic acid having the formula:

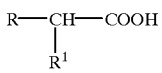

wherein R is a $C_{10}$ to $C_{24}$ alkyl or alkenyl group and $R^1$ is either hydrogen, a $C_1$ to $C_4$ alkyl group or a —$CH_2$—COOH group, or an anhydride, acid chloride or ester thereof or (ii) a di- or polycarboxylic acid containing from 36 to 100 carbon atoms or an anhydride, acid chloride or ester thereof, the composition having a TBN greater than 300.

The additive concentrate can be prepared by reacting at elevated temperature (1) a hydrocarbyl phenol and sulphur, (2) an alkaline earth metal base, (3) a solvent such as a polyhydric alcohol, (4) a lubricating oil, (5) carbon dioxide, and (6) sufficient to provide from greater than 2 to less than 40% by weight based on the weight of the concentrate of either (i) a carboxylic acid having the formula (I) or an acid anhydride, acid chloride or ester thereof or (ii) a di- or polycarboxylic acid containing from 36 to 100 carbon atoms or an acid anhydride, acid chloride or ester thereof. Our EP-A-273588 also discloses an alkaline earth metal sulphurised hydrocarbyl phenate-containing composition having a high TBN. The composition can be prepared by reacting at elevated temperature (A) a sulphurised alkaline earth metal hydrocarbyl phenate having a TBN less than that of the final additive concentrate, (B) an alkaline earth metal base added in either a single addition or in a plurality of additions at intermediate points during the reaction, (C) either a polyhydric alcohol having from 2 to 4 carbon atoms, a di- or tri-($C_2$ to $C_4$) glycol, an alkylene glycol alkyl ether or a polyalkylene glycol alkyl ether, (D) a lubricating oil, (E) carbon dioxide added subsequent to the, or each, addition of component (B), and (F) sufficient to provide from greater than 2 to 35% by weight based on the weight of the concentrate of either (i) a carboxylic acid having the formula (I) or an acid anhydride, or ester thereof or (ii) a di- or polycarboxylic acid containing from 36 to 100 carbon atoms or an acid anhydride, or ester thereof, the weight ratio of components (A) to (F) being such as to produce a concentrate having a TBN greater than 300. Thus the process of EP-A-271262 is one for the production of a high TBN alkaline earth metal-containing composition from the precursors of a sulphurised hydrocarbyl phenol ie a hydrocarbyl phenol and elemental sulphur (first-intent process), whereas the process of EP-A-273588 is a process for the production of a high TBN alkaline earth metal containing composition by upgrading a pre-formed alkaline earth metal sulphurised hydrocarbyl phenate (upgrade process).

Relative to lubricating oil, for example, the cost of hydrocarbyl phenols is high. Moreover, there is growing concern that alkyl phenols, by mimicking or blocking the action of the natural hormone estrogen, may be associated with reproductive abnormalities and cancer in animals and humans (cf Jan. 31, 1994 C&EN, pages 19–23). Because the alkaline earth metal containing compositions as prepared according to the processes described in EP-A-271262 and EP-A-273588 contain a high proportion of chemically incorporated hydrocarbyl phenol relative to lubricating oil their cost is higher than it might otherwise be. Expressed in another way, the scale up factor, that is the ratio of the weight of the higher TBN alkaline earth metal sulphurised hydrocarbyl phenate containing concentrate (Yg) to the weight of alkaline earth metal sulphurised hydrocarbyl phenate or its precursors in the initial reactants (Xg) in the prior art processes is low. Typically in the process of EP-A-273588, for example, the scale up factor is in the range from 1 to 1.5. The prior art problem to be solved therefore is that of how to increase the proportion of lubricating oil incorporated in the alkaline earth metal hydrocarbyl phenate containing concentrate composition relative to hydrocarbyl phenol, thereby lowering the cost of the product and possibly improving its environmental acceptance, without substantially affecting its properties or, expressed in terms of scale up factor how to increase the scale up factor. We have found that a solution to the problem posed by the prior art is to react the hydrocarbyl phenate or its precursors before overbasing with an aldehyde, and in particular formaldehyde in one or other of its physical forms, and optionally also with sulphur.

Processes in which sulphurised hydrocarbyl phenols are reacted with formaldehyde prior to reaction with an alkaline earth metal are known. Thus, U.S. Pat. No. 3,91,830 discloses, inter alia, sulphurising a phenol, reacting it with formaldehyde to produce a sulphur—and methylene-bridged polyphenol composition and thereafter reacting the composition with an excess of a metal base. SU-A-1174466 discloses a method of obtaining a polyfunctional additive for motor oils by treating sulphurised alkyl phenol with a hydroxide of an alkaline earth metal characterised in that, with the aim of improving the detergent-dispersive properties and lowering the ash content of the additive, the sulphurised alkyl phenol is subjected beforehand to condensation with formaldehyde at 65–95° C. for 1–1.5 h in the presence of a catalyst and calcium hydroxide is used as the hydroxide of an alkaline earth metal. Neither of these publications are, however, concerned with high TBN, high scale-up factor additive concentrates.

Accordingly the present invention provides an additive concentrate having a TBN greater than 300 suitable for incorporation into a finished lubricating oil composition comprising:

(I) a lubricating oil soluble sulphurised or non-sulphurised alkaline earth metal hydrocarbyl phenate derived either from a hydrocarbyl phenate or its precursors and modified by reaction to incorporate:
 (i) an aldehyde, and
 (ii) from greater than 2 to less than 40% by weight based on the weight of the concentrate of either (a) at least one carboxylic acid having the formula:

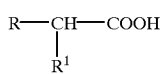

wherein R is a $C_{10}$ to $C_{24}$ alkyl or alkenyl group and $R^1$ is either hydrogen, a $C_1$ to $C_4$ alkyl group or a —$CH_2$—COOH group, or an anhydride or ester thereof or (b) a di- or polycarboxylic acid containing from 36 to 100 carbon atoms or an anhydride or ester thereof, and (II) a lubricating oil, wherein the amount of lubricating oil (II) in the additive concentrate is such that the ratio of the weight of the additive concentrate to the weight of the hydrocarbyl phenate or its precursors from which the modified sulphurised or non-sulphurised alkaline earth metal hydrocarbyl phenate is derived is at least 3.0.

The TBN of the concentrate is greater than 300, preferably greater than 350, more preferably greater than 380.

Suitably the concentrate has a viscosity as measured at 100° C. of less than 1000 cSt, preferably less than 750 cSt, more preferably less than 500 cSt.

The alkaline earth metal hydrocarbyl phenate may be sulphurised or non-sulphurised. For the achievement of higher scale-up factor concentrates it is preferred that the phenate be sulphurised. Suitably it may contain at least 4% by weight sulphur.

Whilst any aldehyde capable of reacting with the phenate may be utilised it is preferred to employ formaldehyde in one or other of its forms. It is believed that the aldehyde condenses with hydrocarbyl phenol thereby to bridge at least two hydrocarbyl phenol molecules, the aldehyde-bridging in the case of formaldehyde for example being methylene bridging, though we do not wish to be bound by this theory. Suitably the amount of aldehyde present may be in the range from 0.03 to 0.20, preferably from 0.10 to 0.20 weight for weight of alkaline earth metal hydrocarbyl phenate.

The alkaline earth metal is suitably either calcium, magnesium or barium, preferably calcium or barium, more preferably calcium, and the hydrocarbyl substituent is suitably an aliphatic hydrocarbyl group, for example an alkyl or alkylene group. The hydrocarbyl substituent is preferably an alkyl group which may be branched or unbranched. Suitable alkyl groups contain from 4 to 50, preferably from 9 to 28 carbon atoms. A particularly suitable alkyl phenol, for example, is the $C_{12}$- alkyl phenol obtained by alkylating phenol with propylene tetramer. The hydrocarbyl-substituted phenate may be mono- or poly-substituted.

The hydrocarbyl phenate is modified by reaction to incorporate from greater than 2 to less than 40% by weight based on the weight of the concentrate of either (a) at least one carboxylic acid having the formula (I) or an anhydride or ester thereof or (b) a di- or polycarboxylic acid containing from 36 to 100 carbon atoms or an anhydride or an ester thereof. As regards the carboxylic acid having the formula (I) R is preferably an unbranched alkyl or alkenyl group. Preferred acids of formula (I) are those wherein $R^1$ is a $C_{10}$ to $C_{24}$, more preferably $C_{18}$ to $C_{24}$ unbranched alkyl group. Examples of suitable saturated carboxylic acids of formula (I) include capric, lauric, myristic, palmitic, stearic, isostearic, arachidic, behenic and lignoceric acids. Examples of suitable unsaturated acids of formula (I) include lauroleic, myristoleic, palmitoleic, oleic, gadoleic, erucic, ricinoleic, linoleic and linolenic acids. Mixtures of acids may also be employed, for example rape top fatty acids. Particularly suitable mixtures of acids are those commercial grades containing a range of acids, including both saturated and unsaturated acids. Such mixtures may be obtained synthetically or may be derived from natural products, for example tall, cotton, soyabean, sunflower, herring and sardine oils and tallow. Sulphurised acids and acid mixtures may also be employed. Instead of, or in addition to, the carboxylic acid there may be used the acid anhydride. It is preferred however to use a carboxylic acid or a mixture of carboxylic acids. A preferred carboxylic acid of formula (I) is stearic acid or mixed fatty acids having carbon chains lengths in excess of $C_{12}$. As regards the di- or polycarboxylic acid (b) this is preferably a polyisobutene succinic acid or a polyisobutene succinic anhydride. Typically, from 10 to 35%, preferably from 12 to 20%, for example 16% by weight based on the weight of the concentrate of (ii) (a) or (b) is employed.

The lubricating oil [component (II)] is suitably an animal oil, a vegetable oil or a mineral oil. Suitably the lubricating oil is a petroleum-derived lubricating oil, such as naphthenic base, paraffin base or mixed base oil. Solvent neutral oils are particularly suitable. Alternatively, the lubricating oil may be a synthetic lubricating oil. Suitable synthetic lubricating oils include synthetic ester lubricating oils, which oils include diesters such as di-octyl adipate, di-octyl sebacate and tridecyladipate, or polymeric hydrocarbon lubricating oils, for example liquid polyisobutenes and poly-alpha olefins. The amount of lubricating oil in the additive concentrate is such that the ratio of the weight of the additive concentrate to the weight of the hydrocarbyl-substituted phenate or its precursors is at least 3.0, preferably at least 5.0, more preferably at least 10.0.

In another aspect the present invention provides a process for the production of an additive concentrate as hereinbefore described which process comprises reacting at elevated temperature:

(A) at least one compound which is A (i) an alkaline earth metal hydrocarbyl-substituted phenate, A (ii) a hydrocarbyl-substituted phenol, A (iii) an alkaline earth metal hydrocarbyl-substituted phenate and a source of sulphur, A (iv), a hydrocarbyl-substituted phenol and a source of sulphur, A (v) an alkaline earth metal sulphurised hydrocarbyl-substituted phenate or A (vi) a sulphurised hydrocarbyl-substituted phenol, (B) an aldehyde, (C) an alkaline earth metal base added either in a single addition or in a plurality of additions at intermediate points during the reaction, (D) a solvent comprising either:
  (1) either:
    (i) a polyhydric alcohol having 2 to 4 carbon atoms,
    (ii) a di- ($C_3$ or $C_4$) glycol,
    (iii) a tri- ($C_2$–$C_4$) glycol, or
    (iv) a mono- or poly-alkylene glycol alkyl ether of the formula:-

$$R(OR^1)xOR^2 \tag{II}$$

wherein in the formula (II) R is a $C_1$ to $C_6$ alkyl group, $R^1$ is an alkylene group, $R^2$ is hydrogen or a $C_1$ to $C_6$ alkyl group and x is an integer of from 1 to 6, either alone or in combination with either (2) a hydrocarbon solvent or (3) either (a) water, (b) a $C_1$ to $C_{20}$ monohydric alcohol, (c) a ketone containing up to 20 carbon atoms, (d) a carboxylic acid ester containing up to 10 carbon atoms or (e) an aliphatic, alicyclic or aromatic ether containing up to 20 carbon atoms or, (4) a $C_1$ to $C_4$ monohydric alcohol in combination with a hydrocarbon solvent (2), (E) a lubricating oil in an amount such that the ratio of the weight of the additive concentrate to the weight of the hydrocarbyl phenate [(A)(i), (iii) or (v)]or their precursors [(A)(ii)(iv) or (vi)] is at least 3.0, (F) carbon dioxide added subsequent to each addition of component (C), (G) either (i) a carboxylic acid of the formula (I):

(I)

wherein R is a $C_{10}$ to $C_{24}$ alkyl or alkenyl group and $R^1$ is hydrogen, a $C_1$ to $C_4$ alkyl group or a —$CH_2COOH$ group, or (ii) a di- or polycarboxylic acid containing from 36 to 100 carbon atoms, or an anhydride of either (i) or (ii) and (H) optionally a catalyst for the reaction with (F), wherein component (A) is reacted with component (B) before reaction with components (C) and (F).

As regards component (A), this is at least one compound which is A (i) an alkaline earth metal hydrocarbyl-substituted phenate, A (ii) a hydrocarbyl-substituted phenol, A (iii) an alkaline earth metal hydrocarbyl-substituted phenate and a source of sulphur, A (iv) a hydrocarbyl-substituted phenol and a source of sulphur, A (v) an alkaline earth metal sulphurised hydrocarbyl-substituted phenate or A (vi) a sulphurised hydrocarbyl-substituted phenol. The hydrocarbyl substituent or substituents of the compounds (A)(i)–(vi) may suitably be an alkyl or alkenyl group, preferably a $C_1$–$C_{18}$ alkyl group. Preferably, the hydrocarbyl group is a dodecyl group derived from propylene tetramer. The alkaline earth metal is preferably either calcium, magnesium or barium, more preferably calcium or barium, most preferably calcium. The amount of sulphur in (A)(i) to (A)(vi), is preferably at least 4% by weight, typically in the range from 0 to 20% by weight. The compounds (A)(i)–(vi) and their preparation are well known in the art. Many are commercially available.

As regards component (B), this is an aldehyde. As the aldehyde there may be used formaldehyde, butyraldehyde, propionaldehyde, dodecylaldehydes and higher alkyl aldehydes. It is preferred to use formaldehyde. Formaldehyde may be added in any of its physical forms but it is preferred to use either paraformaldehyde or aqueous formaldehyde (formalin), of which formalin is more preferred. The aldehyde may suitably be added in an amount sufficient to react with any hydrocarbyl phenol present in (A)(i)–(vi) on at least a 1:1 basis. The reaction of (A) with (B) may suitably be accomplished at elevated temperature, suitably in the range from 30 to 120° C., typically from 50 to 100° C.

Component (C) is an alkaline earth metal base added either in a single addition or in a plurality of additions at intermediate points during the reaction. The alkaline earth metal is preferably calcium, magnesium or barium, more preferably calcium or barium, most preferably calcium. The base moiety may suitably be an oxide or a hydroxide, preferably the hydroxide. A calcium base may be added, for example, in the form of quick lime (CaO) or in the form of slaked lime ($Ca(OH)_2$), preferably in the form of slaked lime.

As regards the amount of component (C) to be added, this should be sufficient to achieve the desired TBN. The amount will be greater starting with components (A) (ii), (A) (iv) and A (vi) than it will be starting with components (A) (i), A (iii) and (A) (v) by the amount required to convert the phenol to the phenate.

Component (D) is a solvent for the reactants. The solvent (D) may be either (D) (1) alone or in combination with either (D)(2) or (D)(3), or the solvent (D) may be (D)(4) in combination with (D)(2) wherein:

(D)(1) is either (i) a polyhydric alcohol having 2 to 4 carbon atoms, (ii) a di-($C_3$ or $C_4$) glycol, (iii) a tri- ($C_2$ to $C_4$) glycol or (iv) a mono- or poly-alkylene glycol alkyl ether of the formula:-

(II)

wherein in the formula (II) R is a $C_1$ to $C_6$ alkyl group, $R^1$ is hydrogen or a $C_1$ to $C_6$ alkyl group and x is an integer from 1 to 6. Suitable compounds having the formula (II) include the monomethyl or dimethyl ethers of (a) ethylene glycol, (b) diethylene glycol, (c) triethylene glycol or (d) tetraethylene glycol. A suitable compound is methyl diglycol ($CH_3OCH_2CH_2OCH_2CH_2OH$). Mixtures of glycol ethers of formula (II) and glycols may also be employed. The polyhydric alcohol may suitably be either a dihydric alcohol, for example ethylene glycol or propylene glycol, or a trihydric alcohol, for example glycerol. The di-($C_3$ or $C_4$) glycol may suitably be dipropylene glycol, the tri- ($C_2$ to $C_4$) glycol may suitably be triethylene glycol. Preferably the component (D)(1) is either ethylene glycol or methyl diglycol. (D)(2) is a hydrocarbon solvent which may be aliphatic or aromatic. Examples of suitable hydrocarbons include toluene, xylene, naphtha and aliphatic paraffins, for example hexane, and cycloaliphatic paraffins. (C)(3) may be either (i) water, (ii) a $C_1$ to $C_{20}$ monohydric alcohol, (iii) a ketone having up to 20 carbon atoms, (iv) a carboxylic acid ester having up to 10 carbon atoms or (v) an aliphatic, alicyclic or aromatic ether having up to 20 carbon atoms. Examples are methanol, 2-ethyl hexanol, cyclohexanol, cyclohexanone, benzyl alcohol, ethyl acetate and acetophenone. (D)(4) may be a $C_1$ to $C_4$ monohydric alcohol, preferably methanol. Preferred solvents (D) comprise ethylene glycol, a mixture of ethylene glycol and 2-ethyl hexanol and a mixture of methanol and toluene.

Component (E) is a lubricating oil. The lubricating oil may suitably be an animal, a vegetable or a mineral oil. Suitably the lubricating oil is a petroleum—derived lubricating oil, such as a naphthenic base, paraffin base or mixed base oil. Solvent neutral oils are particularly suitable. Alternatively, the lubricating oil may be a synthetic lubricating oil. Suitable synthetic lubricating oils include synthetic ester lubricating oils, which oils include diesters such as di-octyl adipate, di-octyl sebacate and tri-decyladipate, or polymeric hydrocarbon lubricating oils, for example liquid polyisobutene and poly-alpha olefins.

Component (F) is carbon dioxide added subsequent to each addition of component (C). Carbon dioxide may be added in the form of a gas or a solid, preferably in the form of a gas. In gaseous form it may suitably be blown through the reaction.

Component (G) is either (i) a carboxylic acid of the formula (I), or (ii) a di- or polycarboxylic acid containing from 36 to 100 carbon atoms or an acid anhydride of either (i) or (ii) as hereinbefore described.

Component (H) is a catalyst. The catalyst may be either an inorganic compound or an organic compound, preferably an inorganic compound. Suitable inorganic compounds include hydrogen halides, metal halides, ammonium halides, metal alkanoates, ammonium alkanoates or a mono-, di-, tri- or tetra-alkyl ammonium formate or alkanoate. As regards the metal moiety of metal halides or metal alkanoates, this is suitably either zinc, aluminium, or an alkaline earth metal, for example calcium. A preferred metal moiety is calcium. As regards the halide moiety, the chloride is preferred. The alkanoate moiety is suitably a $C_2$ to $C_{10}$ alkanoate, preferably a $C_2$ to $C_4$ alkanoate, for example an acetate or propionate. When a substituted ammonium compound is used, it is preferably a tetra- ($C_1$ to $C_4$ alkyl) ammonium compound, especially a tetramethylammonium compound such as tetramethylammonium acetate. Examples of suitable catalysts include calcium chloride, ammonium chloride, calcium acetate, ammonium acetate, zinc acetate, and tetramethylammonium acetate. Suitably the amount of catalyst employed may be up to 2.0% wt/wt. The catalyst facilitates the overbasing process and may have other benefits. It is preferred that a catalyst be employed in the reaction.

As regards the order of addition, component (A) is reacted with component (B) before reaction with components (C) and (F). For the reaction of component (A) with component (B) it is preferred to employ a catalyst. Suitable catalysts include both organic and inorganic bases. It will usually be found most convenient to use as the catalyst in the reaction of (A) with (B) an alkaline earth metal base identical with the base used as component (C). A preferred order of addition comprises in a first step reacting component (A) with component (B) in the presence of components (D) and (G) and a catalytic amount of component (C) to form a sulphur- and aldehyde-containing alkaline earth metal hydrocarbyl phenate and thereafter in a subsequent step or steps reacting the phenate with components (C) and (F). Component (E), the lubricating oil, may suitably be added with components (A) and (B). Provided it is present before the addition of component (F), the catalyst for the carbonation (component H) may be added at any point, suitably after completion of the first step.

Suitably the elevated temperature at which the process is operated may be a temperature in the range from 15 to 200° C., preferably from 50 to 175° C. The selection of the optimum temperature within the aforesaid range will depend to a large extent on the nature of the solvent employed.

At the conclusion of the reaction it is preferred to recover the concentrate as a solution in lubricating oil by separating off the solvent (D), for example by distillation at subatmospheric pressure.

Finally, it is preferred to separate off any insoluble matter, suitably by filtration or centrifugation, preferably by filtration.

It is an advantage of the process of the invention that it produces concentrates which are easily processable by reason of their low sediment content and good filterability. Moreover, the concentrate at comparable TBNs contains a higher proportion of lubricating oil than hitherto, thereby rendering it more economical to employ in finished lubricating oil compositions.

According to a further aspect of the present invention, there is provided a finished lubricating oil composition which composition comprises a major proportion of a lubricating oil and a minor proportion of an additive concentrate as hereinbefore described.

The amount of additive concentrate present in the finished lubricating oil will depend on the nature of the final use. Thus, for marine lubricating oils the amount of additive concentrate present may suitably be sufficient to provide a TBN of 9 to 100 and for automobile engine lubricating oils the amount may suitably be sufficient to provide a TBN of 4 to 20.

The finished lubricating oil may also contain effective amounts of one or more other types of conventional lubricating oil additives, for example viscosity index improvers, anti-wear agents, antioxidants, dispersants, rust inhibitors, pour-point depressants, or the like, which may be incorporated into the finished lubricating oil composition either directly or through the intermediacy of the concentrate composition.

The invention will now be further illustrated by reference to the following Examples.

The term "TBN" is used to denote the Total Base Number in mg KOH/g as measured by the method of ASTM D2896. The viscosity was measured by the method of ASTM D445. In the Examples and Comparison Tests which follow the abbreviations $V_{100}$, $V_{40}$ and VI are employed. These represent the viscosity at 100° C., the viscosity at 400° C. and the viscosity Index respectively. The calcium phenate starting material in Examples 1–4 is a calcium sulphurised $C_{12}$-alkyl phenate (150 TBN) having a calcium content of 5% w/w and a sulphur content of 4.6% w/w.

EXAMPLE 1

A slurry comprising:
Calcium sulphurised $C_{12}$-alkyl: 58 g
phenate
Lubricating oil (SN 150): 171 g
Ethylene glycol: 42 g
Paraformaldehyde: 4 g
Lime: 10 g
was heated to 145° C./21" Hg and held for 15 minutes. Prifac 7920 (a commercially available product from Unichema containing a mixture of mainly $C_{16}/C_{18}$ saturated and
unsaturated fatty acids): 68 g
was added and, after a further 10 minutes at 145° C./21' Hg the mixture was cooled to 100° C./1 bar. There was then added:
2-Ethyl hexanol: 150 g
Lime: 100 g
Calcium acetate: 4 g
The mixture was then held at 130° C./11" Hg for 10 minutes.
Carbon dioxide: 60 g
was added at 130° C./1 bar.
The product was solvent stripped to 210°/28" Hg.
Product weight: 446 g
Scale-up factor (58 g of calcium sulphurised
alkyl phenate was scaled-up to 446 g product): 7.7:1
Distillate weight: 211 g
Crude sediment: 1.8% V/V
A very fast filtration rate was achieved. The filtered product contained:
Calcium: 14.2% w/w
Sulphur: 0.9% w/w
TBN calculated: 399 mg KOH/g
TBN observed: 386 mg KOH/g
Viscosity at 100° C.: 230 cSt

EXAMPLE 2

The conditions of Example 1 were repeated except that formaldehyde was omitted from the recipe.

The crude sediment level increased to 4.4% and the product filtration rate was poor.

Thus formaldehyde bridging improves product filtration.

EXAMPLE 3

A slurry comprising:
Calcium sulphurised alkyl phenate: 58 g
Lubricating oil (SN 150): 171 g
Ethylene glycol: 42 g
Paraformaldehyde: 4 g
Lime: 10 g
Prifac 7920: 68 g
was heated to 145°/21" Hg and held for 15 minutes and then cooled to 100° C./1 bar. There was then added:
2-Ethyl hexanol: 150 g
Lime: 100 g
Calcium acetate: 4 g
The mixture was held at 130° C./11" Hg for 10 minutes.
Carbon dioxide: 60 g
was added at 130° C./1 bar.
The product was solvent stripped to 210° C./28" Hg.
Product weight: 444 g
Scale-up factor: 7.7:1
Distillate weight: 217 g
Crude sediment: 2.4% v/v
A very fast filtration rate was achieved. The filtered product contained:
Calcium: 13.8% w/w
Sulphur: 0.7% w/w
TBN calculated: 387 mg KOH/g
TBN observed: 378 mg KOH/g
Viscosity at 100° C.: 62 cSt
This Example demonstrates that fatty acid may be included in the starting slurry.

The above are examples of in situ reaction of formaldehyde with the starting phenate. However, it is also possible to prereact the phenate with formaldehyde, as demonstrated in the following examples:

EXAMPLE 4

(A) A slurry comprising:
Calcium sulphurised alkyl phenate: 348 g
Paraformaldehyde: 37 g
Lime: 10 g
Ethylene glycol: 42 g
was heated to 145°/11" Hg and held for 15 minutes after which volatile material was removed at 210°/28" Hg.
Product weight: 372 g
Distillate: 40 g
Filtration rate: VERY FAST
Calcium: 5.0% w/w
Sulphur: 4.1% w/w
Viscosity at 100°: 182 cSt
The viscosity of the starting phenate increased from 119 cSt to 182 cSt and the starting weight gained 24 g (348 to 372 g).
(B) A slurry comprising:
Product from (A) above: 58 g
Lubricating oil: 161 g
Lime: 110 g
Stearic acid: 78 g
Calcium acetate: 4 g
2-Ethyl hexanol: 150 g
was heated to 130° C./11" Hg and held for 10 minutes.
Ethylene glycol: 42 g
was added and held for 5 minutes at 130°/1 bar.
The solvents were then removed at 210° C./28' Hg.
Product weight: 447 g
Scale-up factor: 7.7:1
Crude sidement: 3.2% v/v
Filtration rate: VERY FAST
The filtered product contained:
Calcium: 14.0% w/w
Sulphur: 0.7% w/w
TBN calculated: 393 mg KOH/g
TBN observed: 382 mg KOH/g
Viscosity at 100° C.: 119 cSt

EXAMPLE 5

(A) A slurry comprising:

$C_{12}$ non-sulphurised alkyl phenol: 539 g

Lime: 13 g

Paraformaldehyde: 60 g was heated to 145° C./770 mm Hg and held for 1.5 hours after which the pressure was reduced to 28" Hg and held for a further 1.5 hours.

The product was not filtered.

Product weight: 599 g

Distillate weight: 14 g (B) Product from (A) above: 64 g

Lubricating oil (SN 150): 84 g

Lime: 96 g

Stearic acid: 104 g

2-Ethyl hexanol: 204 g

Calcium acetate: 6 g was heated to 130°/11" Hg and held for 10 minutes.

Ethylene glycol: 32 g was added and held for 15 minutes at 130° C./11" Hg.

Carbon Dioxide: 60 g was added at 130° C./1 bar after which solvents were removed at 210° C./28' Hg.

Product weight: 351 g

Scale-up factor: 5.5:1

Following an acceptable filtration rate the product was found to contain:

Calcium: 13.7% w/w

Sulphur: approx. 200 ppm

TBN calculated: 384 mg KOH/g

TBN observed: 372 mg KOH/g

Viscosity at 100° C.: 433 cSt

Example 5 demonstrates that a non-sulphurised alkyl phenol may be used instead of a sulphurised alkyl phenol.

EXAMPLE 6

A slurry comprising:

An uncarbonated phenate (150 TBN) containing 5.3% of calcium and 5.9% of sulphur: 44 g Lube oil: 175

Lime: 111 g

Stearic acid: 78 g

Calcium acetate: 4 g 2-ethyl hexanol: 110 g was heated at 130° C./11" Hg for five minutes.

Glycol: 42 g was added and reacted at 130° C./11" Hg for five minutes.

Carbon dioxide: 70 g was added at 130° C./1 bar. Solvents were removed at 210° C./10 mm Hg.

Product weight: 445 g

Calcium: 14.1% w/w

Sulphur: 0.7% w/w

Alkalinity value: 385 mg KOH/g

Scale-up factor: 10:1

EXAMPLE 7

A slurry comprising:

An uncarbonated phenate (150 TBN) containing 5.3% calcium and 7.1% sulphur: 22 g

Lube oil: 197 g

Lime: 110 g

Stearic acid: 78 g

Calcium acetate: 4 g 2-ethyl hexanol: 152 g was heated at 130V C./11" Hg for 10 minutes.

Glycol: 42 g was added and reacted at 130° C./11" Hg for five minutes.

Carbon dioxide: 70 g was added at 130° C./1 bar after which solvents were removed at 210° C./10 mm Hg.

Product weight: 438 g

Calcium: 13.7% w/w

Sulphur: 0.8% W/W

Alkalinity value: 383 mg KOH/g

Viscosity at 100° C.: 94 cSt

Scale-up factor: 20:1

EXAMPLE 8

A slurry comprising:

Sulphurised alkyl phenol (1.9% calcium and 8.9% sulphur): 58 g

Lube oil: 171 g

Glycol: 42 g

Lime: 10 g

Paraformaldehyde: 6 g

Prifac 7920 (a product from Unichema which is a mixture of $C_{16}/C_{18}$ sat and unsat fatty acids): 68 g was heated at 145° C./21" Hg for 15 minutes and then cooled to 100° C./1 bar.

2-ethyl hexanol: 150 g

Lime: 104 g

Calcium acetate: 6 g were added and held at 130° C./11" Hg for 10 minutes.

Carbon dioxide: 60 g was added at 130° C./1 bar after which solvents were removed at 210° C./10 mm Hg.

Product weight: 450 g

Crude sediment: 2.0% v/v

Filtration rate: Very fast

Calcium: 14.2% w/w

Sulphur: 1.3% w/w

Alkalinity value: 392 mg KOH/g

Viscosity at 100° C.: 558 cSt

Scale-up factor: 7.7:1

EXAMPLE 9

(A) Preparation of Sulphurised Alkyl Phenol (SAP)

$C_{12}$-alkyl phenol: 378 g

Lime: 17 g

Sulphur: 70 g was heated from 130° C. to 145° C. whilst adding
Glycol: 16 g
and held at 145° C./700 mm Hg for 1.5 hours after which solvents were removed at 210° C./10 mm Hg. After this stage
C$_{12}$ alkyl phenol: 42 g
was added and stirred at 160° C. for 15 minutes. The filtered product contained:
Calcium: 1.9% w/w
Sulphur: 9.1% w/w
(B) Conversion of SAP to Overbased Phenate Concentrate
SAP (from (A) above): 30 g
Glycol: 42 g
Lube oil: 199 g
Lime: 11 g
Paraformaldehyde: 6 g
Prifac 7920: 68 g
was held at 145° C./211, Hg for 15 minutes and then cooled to 100° C./1 bar.
2-ethyl hexanol: 150 g
Lime: 104 g
Calcium acetate: 6 g
was added and reacted at 130° C./11" Hg for 10 minutes.
Carbon dioxide: 90 g
was added at 130° C./1 bar after which solvents were removed at 210° C./10 mm Hg.
Product weight: 456 g
Crude sediment: 4.0% v/v
Filtration rate: Very fast
Calcium: 13.8% w/w
Sulphur: 0.8% w/w
Alkalinity value: 374 mg KOH/g (387 calc)
Viscosity at 100° C.: 166 cSt
Scale-up factor 15.2:1

We claim:

1. A process for the production of an additive concentrate having a TBN greater than 300 and a viscosity measured at 100° C. of less than 1000 cSt which process comprises reacting at elevated temperature:
   (A) a compound selected from the group consisting of (A)(i) an alkaline earth metal hydrocarbyl-substituted phenate, (A)(ii) a hydrocarbyl-substituted phenol, (A)(iii) an alkaline earth hydrocarbyl-substituted phenate and source of sulphur, (A)(iv) a hydrocarbyl-substituted phenol and source of sulphur, (A)(v) an alkaline earth metal sulphurised hydrocarbyl-substituted phenate and (A)(vi) a sulphurised hydrocarbyl-substituted phenol,
   (B) an aldehyde,
   (C) an alkaline earth metal base added either in a single addition or in a plurality of additions at intermediate points during the reaction,
   (D) a solvent selected from the group consisting of: component (D)(1) alone or in combination with component (D)(2) or component (D)(3), or component (D)(4) in combination with component (D)(2)
   component (D)(1) being selected from the group consisting of
      (i) a polyhydric alcohol having 2 to 4 carbon atoms,
      (ii) a di- (C$_3$ or C$_4$) glycol,
      (iii) a tri- (C$_2$–C$_4$) glycol, and
      (iv) a mono- or poly-alkylene glycol alkyl ether of the formula;

wherein in the formula (II) R is a C$_1$ to C$_6$ alkyl group, R$^1$ is an alkylene group, R$^2$ is hydrogen or a C$_1$ to C$_6$ alkyl group and x is an integer of from 1 to 6,
   component (D)(2) being a hydrocarbon solvent,
   component (D)(3) being a solvent selected from the group consisting of
      (a) water,
      (b) a C$_1$ to C$_{20}$ monohydric alcohol,
      (c) a ketone containing up to 20 carbon atoms,
      (d) a carboxylic acid ester containing up to 10 carbon atoms, and
      (e) an aliphatic, alicyclic or aromatic ether containing up to 20 carbon atoms,
   component (D)(4) being a C$_1$ to C$_4$ monohydric alcohol,
   (E) a lubricating oil in an amount such that the ratio of the weight of the additive concentrate to the weight of the hydrocarbyl phenate (A)(i), (iii) or (v) or their precursors (A)(ii), (iv) or (vi) is at least 5.0,
   (F) carbon dioxide added subsequent to each addition of component (C),
   (G) a compound represented by the formula (I):

$$R-\underset{R^1}{CH}-COOH \qquad (I)$$

wherein R is a C$_{10}$ to C$_{24}$ alkyl or alkenyl group and R$^1$ is hydrogen, and
   (H) optionally a catalyst for the reaction with (F),
wherein component (A) is reacted with component (B) in the presence of components (D) and (G) and a catalytic amount of component (C) to form an aldehyde-containing alkaline earth metal hydrocarbyl phenate and then in a subsequent step or steps reacting said aldehyde-containing alkaline earth metal phenate with components (C) and (F).

2. A process according to claim 1 wherein the TBN is greater than 400.

3. A process according to claim 1 wherein the additive concentrate has a viscosity as measured at 100° C. of less than 500 cSt.

4. A process according to claim 1 wherein the aldehyde is selected from the group consisting of formaldehyde, butyraldehyde, propionaldehyde, dodecylaldehyde, and higher alkyl aldehydes.

5. A process according to claim 1, wherein said compound (G) is stearic acid.

6. A process according to claim 1, wherein the additive concentrate has a viscosity as measured at 100° C. of less than 750 cSt.

7. A process according to claim 1, wherein the compound (G) is present in an amount of 10–35% by weight.

8. A process according to claim 1, wherein said compound (G) is present in an amount of 12–20% by weight.

9. A process according to claim 1, wherein said compound (G) is present in an amount of about 16% by weight.

10. A process according to claim 1, wherein said aldehyde is present in an amount of 0.03–0.2% by weight.

11. A process according to claim 1, wherein said aldehyde is present in an amount of 0.1–0.2% by weight.

12. A process according to claim 1, wherein said additive concentrate has a TBN of greater than 350.

13. A process according to claim 1, wherein said additive concentrate has a TBN of greater than 380.

14. A process according to claim 4, wherein the formaldehyde is in the form of paraformaldehyde.

* * * * *